Jan. 29, 1957 R. E. RISLEY 2,779,610
SEALED PIPE COUPLING WITH CONSTRICTIBLE WEDGE BUSHING
Filed May 23, 1950 5 Sheets-Sheet 1
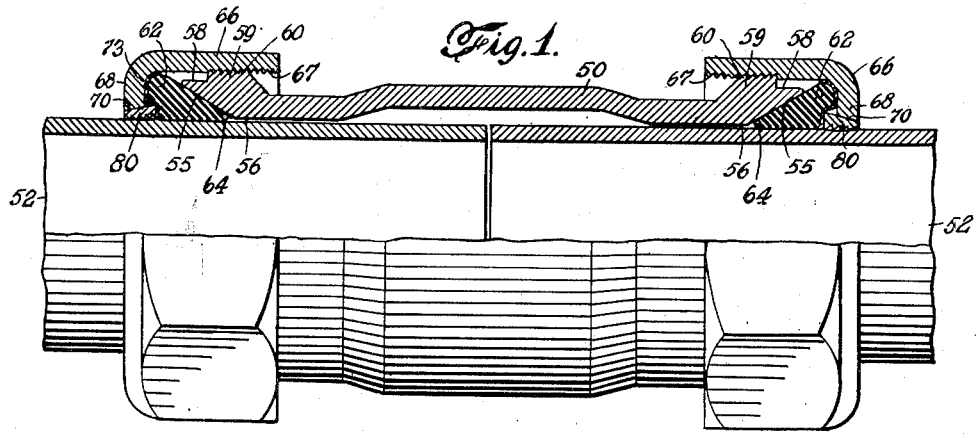
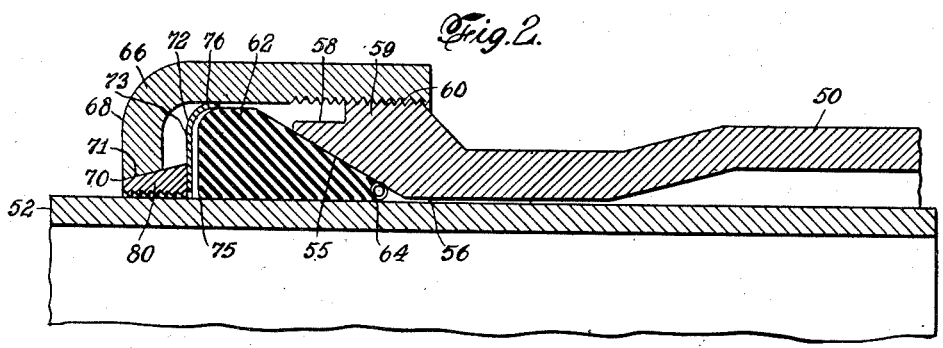
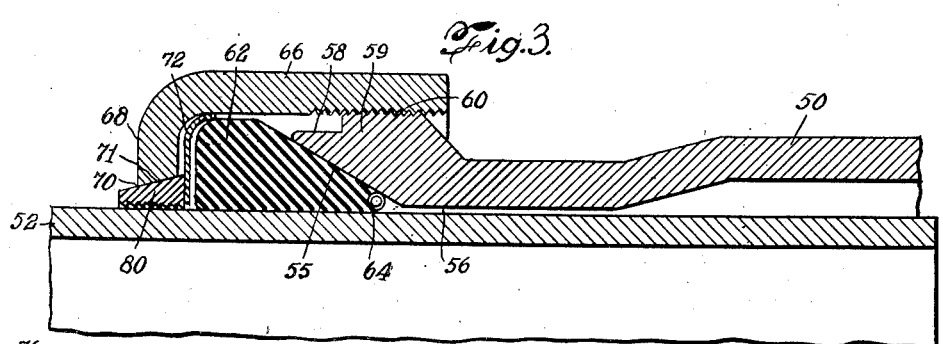
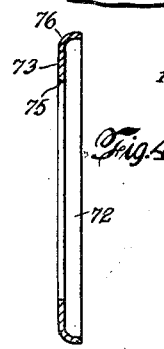 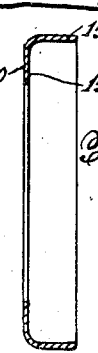  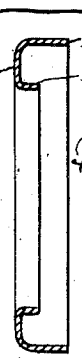
INVENTOR.
ROGER E. RISLEY,
BY
ATTORNEY.

Jan. 29, 1957   R. E. RISLEY   2,779,610
SEALED PIPE COUPLING WITH CONSTRICTIBLE WEDGE BUSHING
Filed May 23, 1950   5 Sheets-Sheet 2
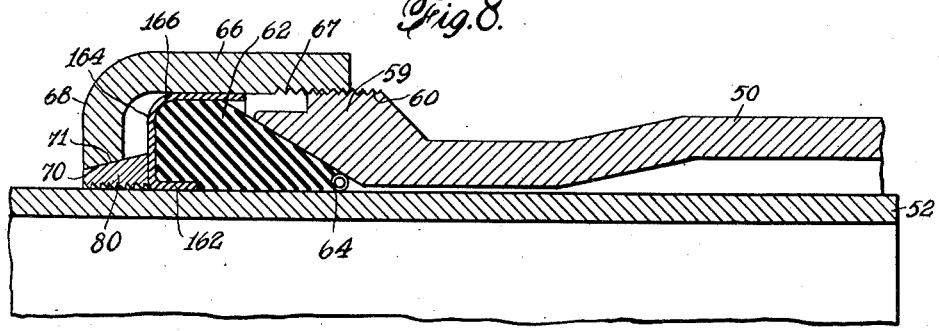
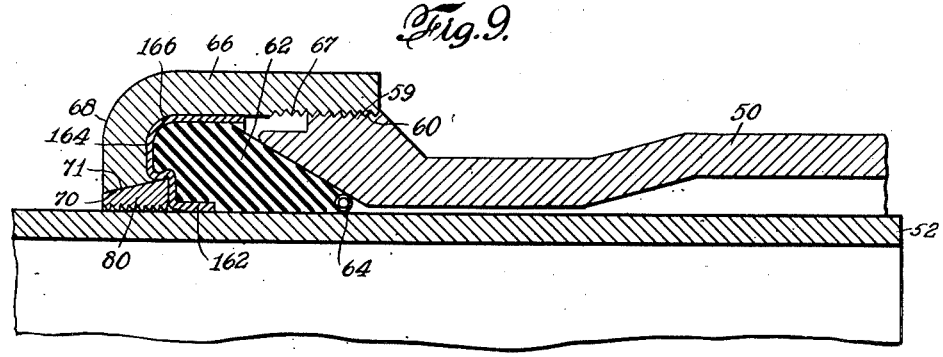
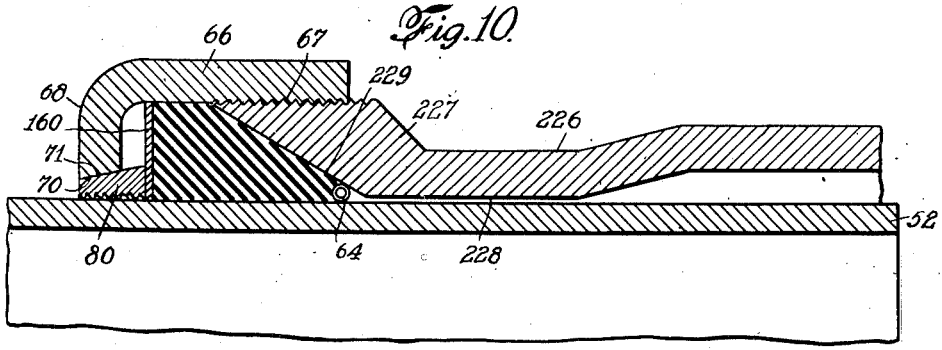
INVENTOR.
ROGER E. RISLEY.
BY
ATTORNEY

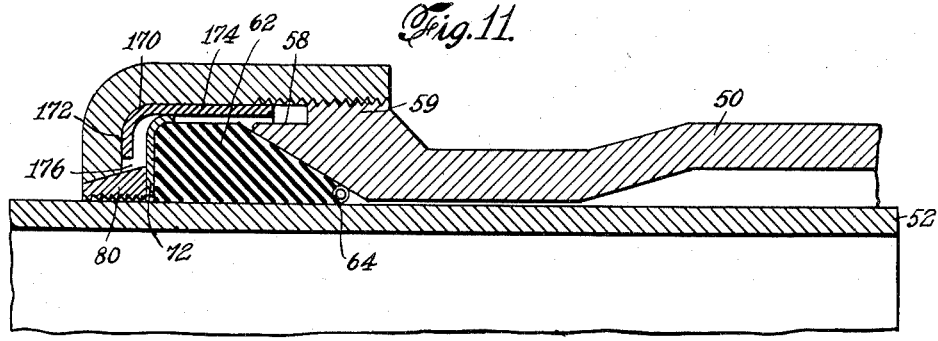
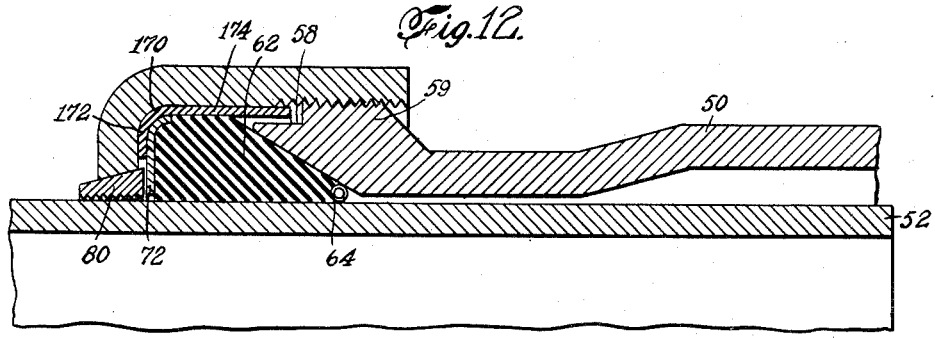
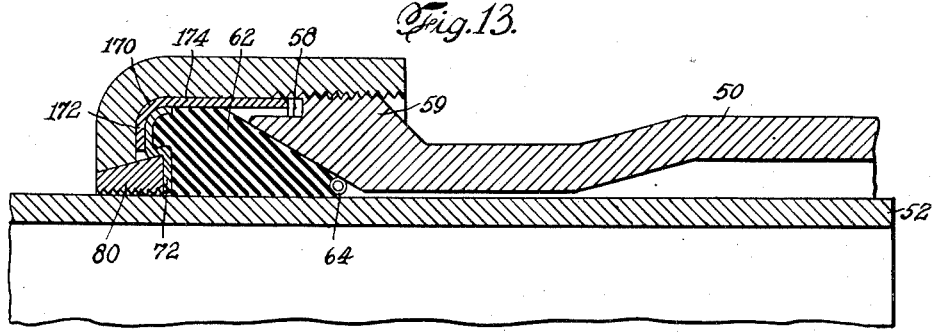
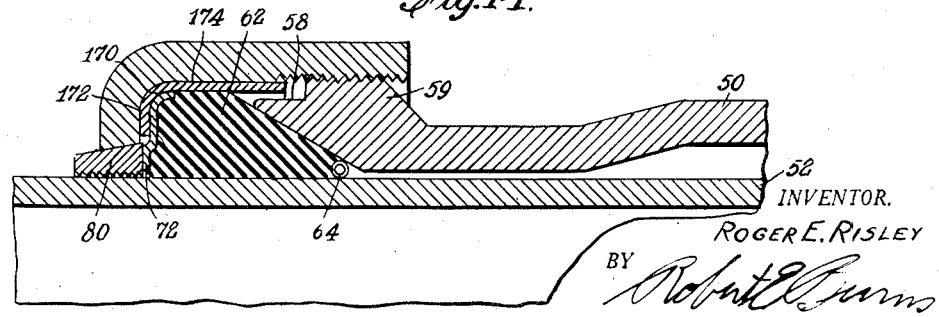

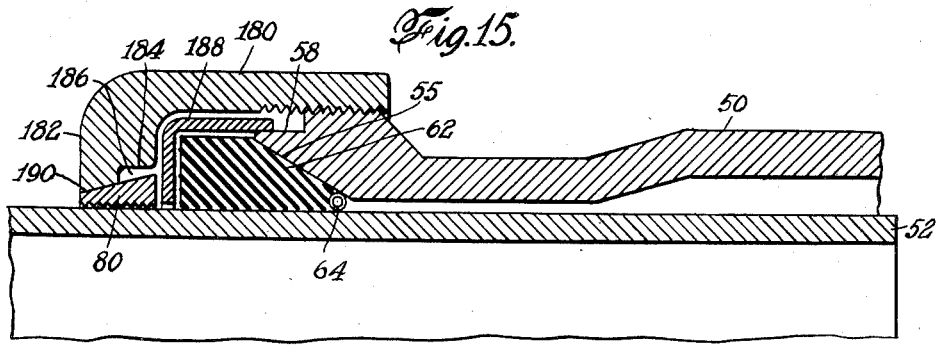
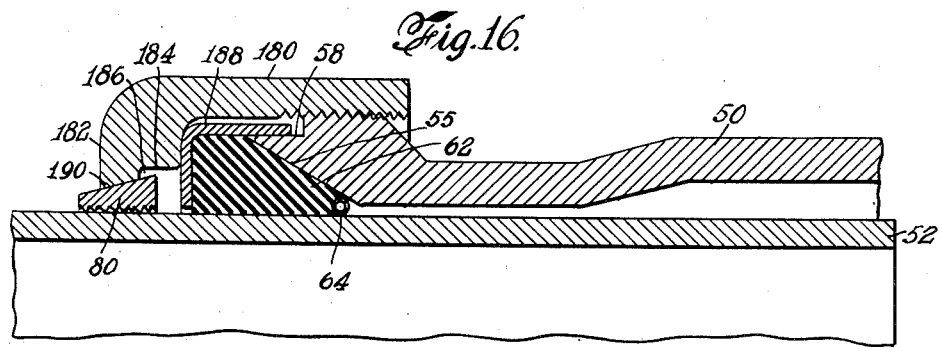
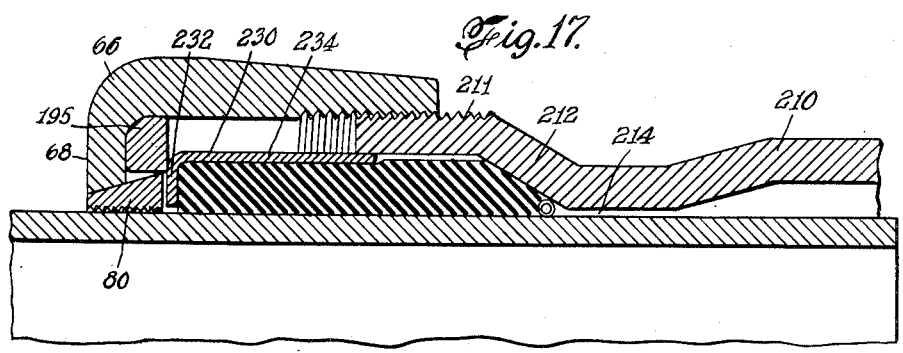
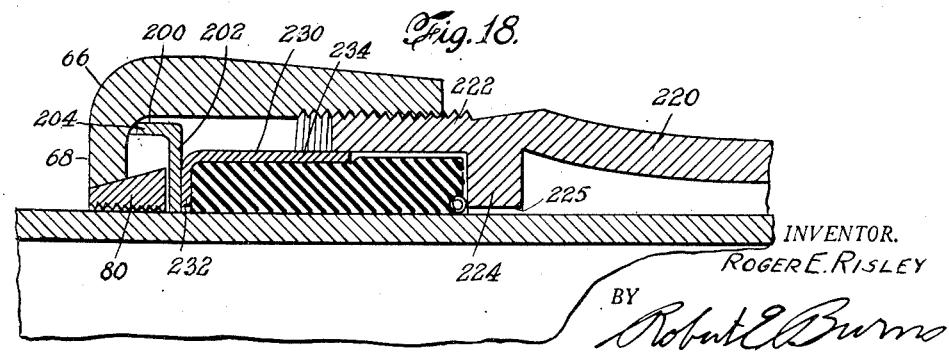

Jan. 29, 1957 R. E. RISLEY 2,779,610
SEALED PIPE COUPLING WITH CONSTRICTIBLE WEDGE BUSHING
Filed May 23, 1950 5 Sheets-Sheet 5
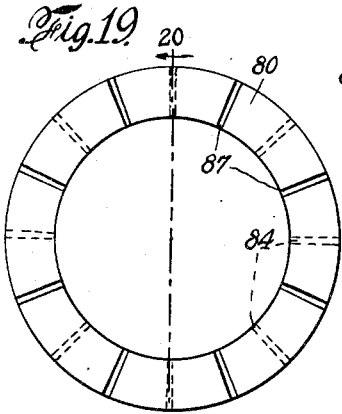
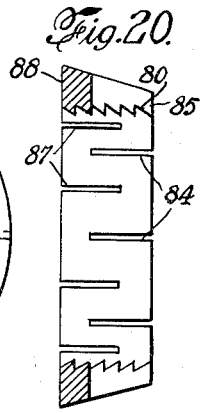
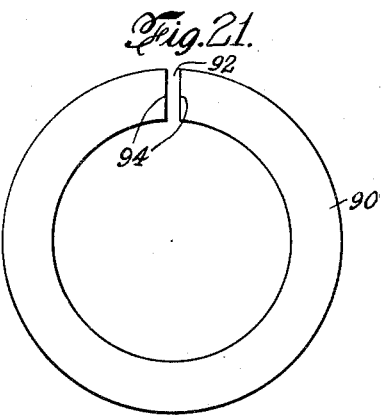
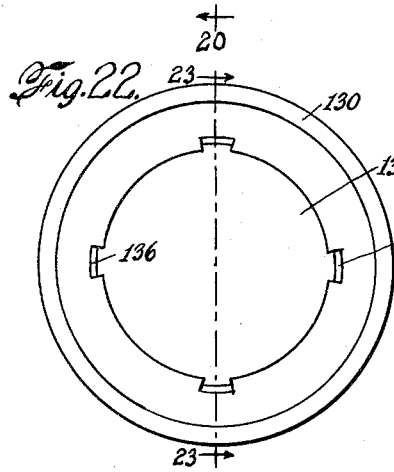
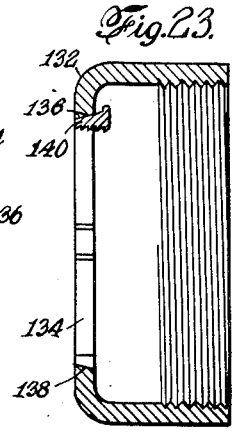
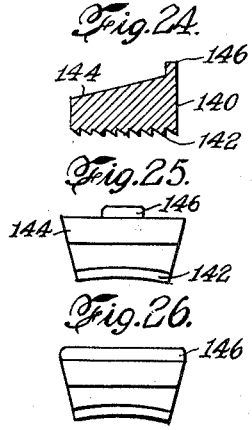
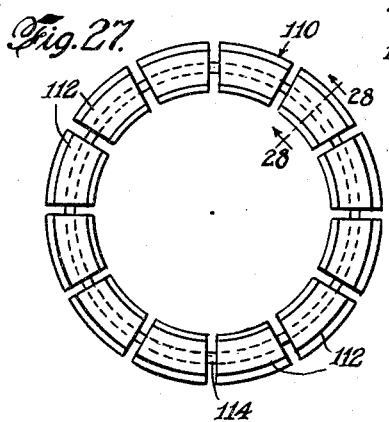
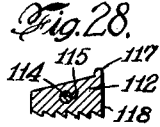
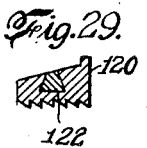
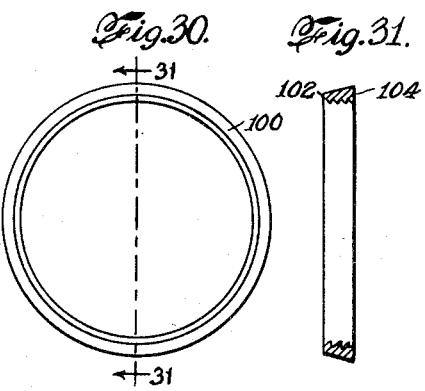
INVENTOR.
ROGER E. RISLEY.
BY
ATTORNEY

United States Patent Office 2,779,610
Patented Jan. 29, 1957

2,779,610

SEALED PIPE COUPLING WITH CONSTRICTIBLE WEDGE BUSHING

Roger E. Risley, Bradford, Pa., assignor to Dresser Industries, Inc., a corporation of Delaware Application May 23, 1950, Serial No. 163,684

8 Claims. (Cl. 285—323)

This invention relates to couplings for pipe, tubing and the like, hereinafter referred to generically as "pipe," and is more particularly concerned with couplings for connecting sections of threaded or unthreaded pipe in flexible fluid-tight relationship and effective to withstand longitudinal stress and prevent outward axial displacement of the pipe sections.

In vertical pipe arrangements, such as are required in water wells and the like which in many cases may be as much as 300 feet in depth and commonly are at least 100 to 150 feet deep, the couplings between the many sections of pipe which are required to make up the suction line of sufficient length for such installations, must not only provide a fluid-tight joint between each section but must also resist the longitudinal stresses exerted by the weight of the pipe sections. The heavier the pipe, of course, the greater the stress. Heretofore, for lack of more effective means, it has been common practice to join the pipe sections in such vertical pipe arrangements by means of ordinary screw couplings. Such couplings require the use of threaded pipe and provide a rigid, non-yielding connection. It is common knowledge that threading a pipe weakens the pipe wall by materially reducing the wall thickness along the threaded portion. It has therefore been necessary to use rather heavy pipe so that the pipe walls will have sufficient strength notwithstanding the threads. Furthermore, in order to obtain a fluid-tight connection which will permit the necessary suction to be created in the line it is necessary that the threads be very accurately cut, which greatly adds to the time and cost of making the installation. The rigidity of the connection obtained with a screw coupling, moreover, is a disadvantage in long vertical pipe installations of this type since vibrations and flexing forces cause an undue stress on the threaded connection.

In order to avoid the aforementioned disadvantages of screw couplings and, in addition, to facilitate the assembly of the pipe lines it has been proposed to use "slip" couplings which eliminate the necessity for threading and greatly reduce the time required for assembly. In connecting pipe sections with a slip coupling it is merely necessary to "stab" the ends of the sections into the coupling and then to tighten the gasket compressing means to squeeze the gaskets into sealing engagement with outer surface of the pipe. The ordinary slip coupling of the type commonly used in the installation of horizontal pipe lines depends for its effectiveness upon the frictional engagement between the gaskets and the outside walls of the pipe sections. In vertical installations, however, where the weight of the line must be taken into account, this frictional engagement exerted by the gasket, while it provides a fluid-tight seal, is not generally adequate to withstand the longitudinal stress continuously exerted by the line and, as a result, outward axial movement of the pipe in the couplings occurs. The various slip couplings heretofore proposed for vertical installations have, therefore, embodied means of one kind or another to withstand such longitudinal stresses. Such prior proposals have, however, not been entirely satisfactory since efforts to provide the necessary resistance to longitudinal stress have generally resulted in lessening the effectiveness of the gasket seal. Some of the proposed prior constructions have been based upon a ball lock mechanism which is dependent upon an outward longitudinal movement of the pipe in the couplings occurs. The various slip couplings gagement to prevent further movement. Thus, the lock is not actuated upon installation but only upon the application of longitudinal stress to the line. Generally, a considerable amount of travel of the pipe sections within the coupling is necessary to insure actuation of the lock and failures have resulted even with the best of such prior arrangements. In other cases, the locking arrangement has been such that the lock is frequently actuated during installation before the gaskets have been fully compressed, using the procedure normally followed in the installation of a coupling of this type. In addition, many of these prior couplings have involved rather complicated constructions making them difficult and expensive to manufacture as well as difficult to install properly.

It is the principal object of the present invention to provide a slip coupling for use in vertical pipe installations which avoids the disadvantages and shortcomings of prior couplings.

It is another object of the invention to provide a coupling of the character indicated wherein the locking means does not interfere with the full compression of the gaskets.

It is another object of the invention to provide an improved locking means for slip couplings.

It is a further object of the invention to provide a slip coupling for vertical pipe installations which is of simple construction, economical to manufacture and effective in use.

In accordance with the invention I provide a coupling comprising a central tubular sleeve or "middle ring" having threaded ends adapted to receive a follower nut which is formed with an inwardly tapered pipe-receiving opening, radially adjustable locking means having a tapered outer peripheral surface of the same slope as the tapered opening in the follower nut and having a serrated pipe-engaging inner peripheral surface, a compressible gasket, and follower means to permit simultaneous compression of the gasket and actuation of the locking means. The various component parts of my coupling are susceptible of a variety of embodiments, as will be fully described hereinafter, but the coupling is characterized in all of its embodiments by a construction which prevents premature actuation of the locking means or insufficient compression of the gasket.

It is a feature of my coupling that it is equally effective with all variations of commercial pipe of a given nominal pipe size and forms a strong, fluid-tight seal both with "maximum" pipe and "minimum" pipe.

It is another feature of my coupling that it is of relatively simple construction and economical to manufacture and may be effectively installed by unskilled workers with an ordinary wrench.

Other objects and features of my invention will be apparent from the following detailed description and from the accompanying drawings, wherein, Fig. 1 is an elevational view, partly in section, showing a coupling embodying features of the invention installed around the ends of two abutting pipe sections;

Fig. 2 is an enlarged fragmentary sectional view of the coupling of Fig. 1 showing the relationship of the parts before the follower nut is tightened upon the sleeve;

Fig. 3 is a similar view of the same coupling as applied to "minimum" pipe of the same nominal pipe size;

Fig. 4 is a cross-sectional view of the deformable follower cup shown in the embodiment of Figs. 1 to 3;

Fig. 5 is a similar view of a modified form of follower cup;

Fig. 6 is a cross-sectional view of a deformable washer shaped follower;

Fig. 7 is a similar view of another modified form of deformable follower cup;

Fig. 8 is a fragmentary sectional view of a coupling showing the use of the deformable follower cup of Fig. 7;

Fig. 9 is a similar view showing the relationship of the various members when the coupling of Fig. 8 is tightened;

Fig. 10 is a fragmentary sectional view of a coupling showing a modified form of middle ring;

Fig. 11 is a fragmentary sectional view of the coupling of Figs. 1–3 showing the use of a non-deformable follower as applied to maximum pipe;

Fig. 12 is a similar view of the same coupling applied to minimum pipe;

Fig. 13 is a similar view of the arrangement of Fig. 11 showing the arrangement of the coupling parts after tightening;

Fig. 14 is a similar view of the arrangement of Fig. 12 after tightening;

Fig. 15 is a fragmentary sectional view of another embodiment of the coupling of the invention showing a modified form of follower nut and follower;

Fig. 16 is a similar view of the same coupling as applied to minimum pipe;

Fig. 17 is a fragmentary sectional view of a modified form of sleeve or "middle ring" and the use of a modified follower and spacing means;

Fig. 18 is a similar view of a coupling having a modified sleeve and showing a modified form of spacing means;

Fig. 19 is a plan view of a locking ring embodying features of the invention;

Fig. 20 is a sectional view taken approximately along the line 20—20 of Fig. 19;

Fig. 21 is a plan view of another embodiment of the locking ring;

Fig. 22 is a plan view of a modified form of follower nut and associated locking elements;

Fig. 23 is a sectional view taken approximately along the line 23—23 of Fig. 22;

Fig. 24 is a sectional view of the locking element shown in Figs. 22 and 23;

Fig. 25 is an end elevation of the locking element;

Fig. 26 is an end elevation of a modified form of the locking element;

Fig. 27 is a plan view of a modified form of locking ring;

Fig. 28 is a sectional view taken approximately along the line 28—28 of Fig. 27;

Fig. 29 is a sectional view of a modified form of locking element;

Fig. 30 is a plan view of another modified form of locking ring; and,

Fig. 31 is a sectional view taken approximately along the line 31—31 of Fig. 30.

Referring to the drawings, and particularly to Figs. 1 to 3, the numeral 50 designates the sleeve or middle ring of an illustrative embodiment of a locking coupling according to my invention. The sleeve 50 is tubular in form and is shown in position around the abutting ends of two pipe sections 52. The inner surface of each end of sleeve 50 is tapered to define a gasket recess 55 extending inwardly of a pipe aperture 56. The outer surface of each end of sleeve 50 has a cylindrical portion 58 extending from the outer edge of sleeve 50 to a raised annular section 59, the outer surface of which is provided with threads 60. In order to facilitate the description of the structure of my coupling, reference hereinafter will be made to one end only of the coupling, but it will be understood that the coupling is symmetrical and that each end is of the same construction.

Inserted in the gasket recess 55 is a gasket 62. The gasket is of annular form, as shown, and is preferably of a shape corresponding to the shape of the space defined by the gasket recess and the outer surface of pipe 52. Thus as shown in Figs. 1 to 3, the outer periphery of the gasket illustrated is tapered from the outer face inwardly toward the inner end of the gasket. The inner edge of the gasket 62 is provided with an expansible metallic ring 64 which normally fits closely around the outer periphery of the pipe 52. The expansible ring 64 is preferably combined with the gasket 62 in a single unitary structure and is shown in the form of an annular armor helix which is molded into the rubber composition of the gasket. The ring 64 prevents extrusion of the gasket material through any space that there may be between the pipe 52 and the pipe aperture 56 and thus protects the material of the gasket from gasoline, oil or other fluid carried by the pipe. The ring 64, when the gasket is compressed, also aids in holding the pipes against longitudinal movement relative to sleeve 50. The gaskets 62 are formed from rubber or rubber composition, this term being used generically to include natural and synthetic rubbers and other elastomeric compounds, or compositions having like properties and characteristics. The material is relatively firm and solid but sufficiently resilient and elastic to flow under pressure to conform to the surfaces between which it is confined.

Cooperating with the sleeve 50 to compress the gasket 62 into fluid-tight sealing engagement with the outer surfaces of pipe 52 is a follower nut 66 having an internally threaded cylindrical end portion 67 engageable with the threads 60 of annular section 59. As shown in Fig. 1, the exterior surface of the follower nut 66 is shaped to provide a wrench section to which may be readily applied a wrench for rotating the nut relative to sleeve 50. Nut 66 has an end wall 68 which is suitably apertured to receive the pipe 52. As shown, end wall 68 is formed with an aperture 70 having an inwardly directed outwardly tapered wall 71, the purpose of which will be fully described hereinafter.

In order to confine and protect the gasket 62 and to prevent frictional resistance by the gasket when the follower nut 66 is rotated in tightening or loosening the coupling, there are provided suitable gasket follower means. In the embodiment shown in Figs. 1 to 3, the gasket follower means take the form of a cup-shaped annular member 72 conveniently stamped or otherwise formed from a relatively thin sheet of metal that is readily deformable under pressure. Thus, the follower 72 is conveniently formed from copper, brass or other readily-deformable metal or alloy. The follower 72 is of a minimum thickness to resist tearing or damage in use but is not of a thickness that will offer any appreciable resistance to deformation. Generally speaking, I have found that in the case of copper and brass and other metals and alloys of comparable malleability, an advantageous thickness is between about .003 inch and .010 inch. It will be obvious that the optimum thickness will depend upon the particular material from which the follower is made. Deformable follower 72 has a body portion 73 formed with a pipe aperture 75 and a peripheral flange 76 which is shaped to conform to the inner end surface of follower nut 66, as shown in Figs. 2 and 3.

In accordance with my invention, I effect the necessary locking of the coupling with respect to the pipe 52 by the action of locking means of trapezoidal cross-section arranged to engage the surface of pipe 52 and the tapered wall 71 of follower nut 66. As shown in Figs. 1 to 3, the locking element has an outer surface of substantially the same slope as the tapered wall 71 and a width substantially greater than the width of wall 71.

It is well-known that the outside diameter of commercial pipes of any given size vary from what may be termed the "nominal" size, some pipe having a diameter greater than the nominal size and some having a lesser diameter. Thus, for each given "nominal" pipe size, the outside diameters of commercial pipes vary from what may be termed "minimum" pipe to what may be called "maximum" pipe. If pipe couplings are to be of general utility, this variation in pipe size must be taken into account. This variation has been at least partly responsible for some of the difficulties encountered in the use of locking couplings heretofore proposed.

It is a feature of the invention that my coupling is of a construction that it may be used with maximum pipe, minimum pipe or pipe of nominal size, and in every case an effective, strong, fluid-tight connection is obtained with equal facility. In all cases the gasket is brought smoothly into sealing engagement with the walls of the pipe and the locking element is brought into firm locking position against the pipe surface without jamming and without restricting the sealing action of gasket.

In constructing my coupling the various components are dimensioned to accommodate the "maximum" pipe of a given nominal pipe size. Thus in constructing a coupling for ¾" or 1" pipe, for example, the pipe apertures 56, the gaskets 62, pipe apertures 75 and rings 64 are formed with sufficiently large diameter to receive the maximum pipe. It will further be observed by reference to Fig. 1 that aperture 70 is of sufficiently great diameter to receive the maximum pipe and the locking element.

As previously mentioned, the locking element which I employ in my locking coupling cooperates with the other components of the coupling in such a manner that premature locking is avoided. The locking element of my invention may take various forms and may be continuous, i. e. it may be in ring form and completely encircle the pipe 52, or it may be discontinuous and engage only a portion of the outer surface of pipe 52. In all cases, however, it comprises a member or members having a sloping outer surface for engagement with wall 71 of follower nut 66 and a serrated or knurled inner surface for engagement with the surface of pipe 52.

Referring to Figs. 19 to 31, there are shown some illustrative embodiments of the locking element. As shown in Fig. 19, the locking element may be annular in form and comprise a ring 80 formed with a sloping outer periphery 81 and a serrated inner periphery 82 to provide a trapezoidal cross-section. It will be observed that ring 80 is articulated by means of axial slots extending inwardly from each face of the ring in order to permit the ring 80 to conform itself to the outer surface of both minimum and maximum pipe. Thus ring 80 is provided with slots 84 extending inwardly from its smaller face 85 and slots 87 extending inwardly from its larger face 88. Slots 84 and 87 are staggered with relation to one another to divide the integral portion of ring 80 into a substantially regular zig-zag pattern as clearly shown in Fig. 20. The slots 84 and 87 are shown as extending approximately two-thirds through the ring 80 but the depth of the slots may be varied. Ordinarily, however, they should extend at least half way through the ring. Ring 80 for any given nominal pipe size is made of sufficiently great internal diameter to slip over maximum pipe of the given nominal size, and the slots 84 and 87 permit the ring 80 to be compressed inwardly by the walls 71 of nut 66 to conform to the outer surface of nominal pipe and minimum pipe, as may be seen in Figs. 1 to 3. The locking ring 80 is mounted on pipe section 52 with its larger face 88 extending inwardly of the coupling. When the coupling is mounted on maximum pipe the ring 80 will have its smaller face 85 substantially flush with the outer face of follower nut end wall 68, whereas when the coupling is mounted on minimum pipe, the face 85 will extend some distance outwardly from end wall 68, but the ring 80 is of sufficient thickness that the larger face 88 does not pass outwardly beyond the inner face of end wall 68. Thus, whether the coupling is used with minimum, maximum or nominal pipe, the tapered wall 71 of follower nut 66 is at all times in contact with the sloping outer surface of ring 80.

Referring to Fig. 21, a modified form of locking ring is shown which is similar to ring 80 but does not have the axial slots 84 and 87 to accommodate inward radial compression when the locking ring is conformed to the outer surface of minimum and nominal pipe. Ring 90 is formed as a split ring, with a space 92 separating the two ends 94. The space 92 permits inward radial compression of split ring 90.

Another embodiment of my locking ring, shown in Figs. 30 and 31, comprises a ring 100 of small radial thickness which may be compressed laterally inwardly by follower nut 66 to conform to pipe diameter variations. Thus, for example, the ring 100 may have a radial thickness of the order of ⅟₃₂–³⁄₃₂ in. at its smaller face 102 and a radial thickness of the order of ⅟₁₆–⅛ in. at its larger face 104.

Instead of being in the form of a continuous ring, such as rings 80 and 100, or a split ring, such as ring 90, my locking means may also comprise a plurality of individual, spaced ring segments interconnected in ring form by suitable connecting and spacing means. Referring to Figs. 27 and 28, there is shown a locking ring 110 formed from a plurality of ring segments 112 each of substantially trapezoidal cross-section and having substantially trapezoidal faces interconnected into a ring by a compressible cord element 114. Cord element 114 passes through apertures 115 in segments 112 and may be a continuous helical coil or spring or may be formed from rubber or other compressible material. Advantageously, segments 112 are formed with a flange or lip 117 extending outwardly from the larger face 118 for retaining the ring 110 in position in the coupling during assembly and shipment. Fig. 29 shows another method of connecting the segments. A segment 120 is formed with a transverse trapezoidal slot 122 in which is received a band or ring of similar cross-section and formed from rubber or other compressible composition. It will be apparent that the compressible connecting means permit the segments of rings 110 to be moved radially inwardly into engagement with the pipe surface under the action of wall 71 of follower nut 66.

In another embodiment of my invention I provide locking means in the form of one or more locking elements engageable in suitable recesses formed in the follower nut. Referring to Figs. 22 and 23, there is shown a modified follower nut 130 having an end wall 132 formed with a pipe-receiving aperture 134 along the periphery of which are formed a series of radially outwardly extending recesses 136 having an inwardly directed outwardly sloping inner wall 138. Arranged to be received in recesses 136 are trapezoidal segments 140 similar in shape to segments 117 but free from any interconnecting means. The segments 140 are formed with a serrated lower face 142 and a sloping upper face 144 having substantially the same slope as the wall 138. The retaining lip 146 may extend entirely across the width of segment 140 as shown in Fig. 26 or may extend across only a portion thereof, as shown in Fig. 25. While in Figs. 22 and 23 I have shown follower nut 130 as having four segment-receiving recesses 136, I may provide a greater or smaller quantity of such recesses. There should, however, be at least two and preferably four.

Furthermore, while I have described my locking means shown in Figs. 19 to 31 as having a serrated inner pipe engaging surface, I mean to include under the term "serrated" a knurled surface or other like friction increasing surface.

It is a feature of my invention that the locking means are directed into locking position, i. e., are actuated, without in any way interfering with the full compression of the gasket, and that the lock is effective with all degrees of gasket compression. That is to say, locking of my coupling on the pipe is not dependent upon any minimum degree of gasket compression and, on the other hand, the locking of the coupling does not prevent the compression on the gasket to any desired extent. I prevent jamming of the locking means and thus avoid premature locking by suitable construction of the gasket compressing members so that the locking elements are at all times resiliently backed.

For example, I have previously referred to deformable follower 72 which permits compression of the gasket 62 without frictional engagement between the gasket and the follower nut 66. The follower 72, being readily deformable, is deformed upon tightening of follower nut 66 upon sleeve 50 as clearly shown in Fig. 1. The locking means, e. g. ring 80, is thus resiliently backed and not subjected to a rigid outward thrust which might drive it against the outer surface of pipe 52 with sufficient force to impede further rotation of follower nut 66. The deformable follower may take various forms, as shown in Figs. 4 to 7. Fig. 4 shows previously-described deformable follower 72 having an apertured body portion 73 and peripherial flange 76. Fig. 5 shows a modified form of follower 150, generally similar to follower 72 but having a body portion 152 and a flange 154 of substantially the same width. As shown in Fig. 6, the deformable follower may comprise a washer 160, or as shown in Fig. 7, follower 150 may be modified by providing an inner flange 162 which forms with body portion 164 and outer flange 166, a follower having a channel-like cross-section.

To insure minimum frictional resistance between follower nut 66 and gasket 62 I advantageously provide my coupling with a non-deformable, cup-shaped follower 170, shown in cross-section in Figs. 11 to 14. Follower 170 is annular in form and comprises an apertured body portion 172 and an axial flange 174. The flange 174 is dimensioned to extend over cylindrical portion 58 of sleeve 50 and the aperture 176 in body portion 172 is sufficiently large that the follower 170 does not come into contact with locking ring 80 at any time during the installation of the coupling. The relationship of non-deformable follower 170 to the remaining parts of the coupling is shown in Figs. 11 and 12 with respect to maximum pipe and minimum pipe, respectively, and the resulting deformation of deformable follower 72 in the two instances is shown in Figs. 13 and 14, respectively.

In another form of my invention I use only a non-deformable follower but modify the shape of the follower nut in such manner that contact between the follower and the locking member is avoided. Referring particularly to Figs. 15 and 16, sleeve 50 is provided with a follower nut 180 similar in construction to follower nut 66 but having a spacing member integral with the end wall 182. The spacing member comprises an inwardly directed enlarged portion 184 in the radially outer portion of end wall 182 which bears against the follower upon compression of gasket 62 and defines an annular space 186 into which the follower 188 does not enter. The annular space 186 thus permits the locking ring 80 or other locking element to be positioned around both maximum and minimum pipe in full engagement with the inner surface 190 of wall 182 of follower nut 180 but without engagement with follower 188.

Instead of integral spacing means as exemplified by enlarged portion 184, I may provide independent spacing members. As shown in Fig. 17, the spacing member may take the form of a ring 195 of sufficient radial thickness to engage the follower but having a sufficiently large aperture to encircle both the pipe and the locking ring 80. As will be apparent by reference to Fig. 17, the thrust from end wall 68 is transmitted to the follower through ring 95 and contact between the follower and locking ring 80 is prevented. As shown in Fig. 18, the spacing means may also take the form of a cup-shaped non-deformable annular member 200 similar to follower 188 and having a body portion 202 and an axial flange 204. The member 200 is placed in follower nut 66 with its flange 204 directed against end wall 68.

It will be seen by reference to Figs. 17 and 18 that the metal ring or sleeve of my coupling may take various forms and my invention is not confined to a coupling having a sleeve of the form of sleeve 50. Thus, referring to Fig. 17, the tubular sleeve 210 is formed with an enlarged externally threaded end portion 211, engageable with the follower nut 66, and a tapered wall 212 spaced inwardly from the end of the sleeve 210 and sloping inwardly to define a gasket recess and a pipe aperture 214. The sleeve 220 shown in Fig. 18 has an externally threaded circular end portion 222 and is provided with an inwardly directed annular ridge 224 forming a pipe aperture 225 and a gasket recess.

In Fig. 10 there is shown a sleeve 226 having an externally-threaded flare end 227 extending outwardly from pipe aperture 228 and defining a gasket recess 229.

It will be observed that the cup-shaped followers are suitably dimensioned to engage the various types of sleeves. In Figs. 17 and 18 the followers 230 are formed with a body portion 232 of sufficiently limited radial width to permit the flanges 234 to slide inside end portions 211 and 222, respectively. The gaskets are also suitably formed to conform to the gasket recesses in the particular middle rings in which they are employed.

My coupling is advantageously completely assembled at the time of manufacture and is thus conveniently shipped and applied with minimum effort. The locking means, e. g. the locking rings 80, 90, 100, 110, or locking members 140 are positioned in the pipe aperture of the follower nut, the followers and the gasket 62 then inserted in the follower nut, and the follower nut is then loosely engaged with the threads of the middle ring. When the coupling is to be applied, the pipe sections to be joined are merely "stabbed" into each end of the coupling and the follower nut then tightened upon the sleeve by means of any suitably sized wrench. As the follower nut is tightened upon the sleeve the gasket 62 is compressed into sealing engagement with the pipe, the expansible metallic ring 64 being wedged against the pipe at the pipe aperture of the sleeve and the locking means, e. g. the ring 80, is urged by the tapered wall of the follower nut aperture into engagement with the surface of the pipe. The deformable followers or the spacing members prevent non-resilient outward thrust upon the locking means so that jamming is prevented. The locking means is, however, at all times in locking engagement with the pipe and outward movement of the pipe with respect to the coupling is prevented. When an outward longitudinal pull is exerted on the pipe, the serrated locking member is forced into firmer engagement with the pipe by reason of the action of the tapered wall 71 against the sloped outer surface of the locking member.

I thus provide an effective lock against longitudinal separation of the two pipe sections joined by my coupling while at the same time insuring an effective fluid-tight seal between the coupling and the pipe. My coupling is suitable for use in connecting the sections of vertical pipe lines in wells and the like, permitting the assembly of such lines rapidly and easily without need of special tools or special skills, and providing a securely jointed line having fluid-tight flexible joints which take up any vibrational or bending stresses to which the line may be subjected in service.

While I have shown and described preferred embodiments of my invention, it will be obvious that various changes and modifications may be made without departing from the scope of my invention, as defined in the appended claims, and it is intended therefore that all matter contained in the foregoing description and in the drawings shall be interpreted as illustrative and not in a limiting sense.

What I claim and desire to secure by Letters Patent is:

1. In a pipe line, a section of pipe and a pipe coupling mounted thereon, said coupling comprising a tubular sleeve having an externally-threaded end providing an internal gasket recess receiving a gasket member, a cup-shaped follower nut threadedly engageable with said sleeve to apply pressure directly to said gasket to compress said gasket member in said gasket recess into fluid sealing relationship with said pipe, said nut having an end wall defining a pipe-receiving aperture for reception of the pipe to be coupled, at least a portion of the wall of said aperture being of substantially greater diameter than the external diameter of said pipe and having an axially sloped surface extending the entire width of said follower wall and sloping inwardly from the inner face to the outer face of said wall, and self-acting locking means disposed in said aperture adjacent said sloped surface, said locking means having an outer peripheral surface of substantially the same slope as that of the sloped surface of the aperture wall for frictional engagement therewith and having a serrated inner peripheral surface, and said locking means extending at least between said inner and outer faces of said follower nut wall, substantially all of the inner radial surface of said gasket member engaging the surface of said pipe and substantially filling the annular cavity of said follower nut whereby said gasket member receives compression forces from said follower nut other than those directed to said locking means, said gasket member and said locking means being urged against the surface of said pipe upon tightening of said follower nut, and deformable anti-friction means for wholly confining the axially outer face of said gasket and preventing direct contact between said gasket and said locking means.

2. In a pipe line, a section of pipe and a pipe coupling mounted thereon, said coupling comprising a tubular sleeve having an externally-threaded end providing an internal gasket recess receiving a gasket member, a cup-shaped follower nut threadedly engageable with said sleeve to apply pressure directly to said gasket to compress said gasket member in said gasket recess into fluid sealing relationship with said pipe, said nut having an end wall defining a pipe-receiving aperture for reception of the pipe to be coupled, the wall of said aperture being of substantially greater diameter than the external diameter of said pipe and having an axially sloped surface extending the entire width of said follower wall and sloping inwardly from the inner face to the outer face of said wall, and an annular self-acting locking member comprising a plurality of resiliently-connected segments disposed in said aperture adjacent said sloped surface, said locking member having an outer peripheral surface of substantially the same slope as that of the sloped surface of the aperture wall for frictional engagement therewith and having a serrated inner peripheral surface, and said locking member extending at least between said inner and outer faces of said follower nut wall, substantially all of the inner radial surface of said gasket member engaging the surface of said pipe and substantially filling the annular cavity of said follower nut, whereby said gasket member receives compression forces from said follower nut other than those directed to said locking member, said gasket member and said locking member being urged against the surface of said pipe upon tightening of said follower nut, and deformable anti-friction means for wholly confining the axially outer face of said gasket and preventing direct contact between said gasket and said locking member.

3. In a pipe line, a section of pipe and a pipe coupling mounted thereon, said coupling comprising a tubular sleeve having an externally-threaded end providing an internal gasket recess receiving a gasket member, a cup-shaped follower nut threadedly engageable with said sleeve to apply pressure directly to said gasket to compress said gasket member in said gasket recess into fluid sealing relationship with said pipe, said nut having an end wall defining a pipe-receiving aperture for reception of the pipe to be coupled, the wall of said aperture being of substantially greater diameter than the external diameter of said pipe and having an axially sloped surface extending the entire width of said follower wall and sloping inwardly from the inner face to the outer face of said wall, and a self-acting locking member disposed in said aperture adjacent said sloped surface, said locking member having an axial width substantially greater than the axial width of said aperture and having an outer peripheral surface of substantially the same slope as that of the sloped surface of the aperture wall for frictional engagement therewith, and being provided with a serrated inner peripheral surface, and said locking member extending at least between said inner and outer faces of said follower nut wall, substantially all of the inner radial surface of said gasket member engaging the surface of said pipe and substantially filling the annular cavity of said follower nut, whereby said gasket member receives compression forces from said follower nut other than those directed to said locking member, said gasket member and said locking member being urged against the surface of said pipe upon tightening of said follower nut, and deformable metallic anti-friction means for wholly confining the axially outer face of said gasket and preventing direct contact between said gasket and said locking member.

4. In a pipe line, a section of pipe and a pipe coupling mounted thereon, said coupling comprising a tubular sleeve having an externally-threaded end providing an internal gasket recess receiving a gasket member, a cup-shaped follower nut threadedly engageable with said sleeve to apply pressure directly to said gasket to compress said gasket member in said gasket recess into fluid sealing relationship with said pipe, said nut having an end wall defining a pipe-receiving aperture for reception of the pipe to be coupled, the wall of said aperture being of substantially greater diameter than the external diameter of said pipe and having an axially sloped surface extending the entire width of said follower wall and sloping inwardly from the inner face to the outer face of said wall, self-acting locking means disposed in said aperture adjacent said sloped surface, said locking means having an outer peripheral surface of substantially the same slope as that of the sloped surface of the aperture wall for frictional engagement therewith and having a serrated inner peripheral surface, and said locking means extending at least between said inner and outer faces of said follower nut wall, substantially all of the inner radial surface of said gasket member engaging the surface of said pipe and substantially filling the annular cavity of said follower nut whereby said gasket member receives compression forces from said follower nut other than those directed to said locking means, said gasket member and said locking means being urged against the surface of said pipe upon tightening of said follower nut, and means for wholly confining the axially outer face of said gasket and preventing direct contact between said gasket and said locking means, said last-named means comprising a readily deformable metal follower disposed between said gasket and said follower nut wall and said locking means, said follower being normally deformed axially-inwardly by said locking means upon tightening of said nut.

5. In a pipe line, a section of pipe and a pipe coupling mounted thereon, said coupling comprising a tubular sleeve having an externally-threaded end providing an internal gasket recess receiving a gasket member, a cup-shaped follower nut threadedly engageable with said sleeve to apply pressure directly to said gasket to compress said gasket member in said gasket recess into fluid sealing relationship with said pipe, said nut having an end wall defining a pipe-receiving aperture for reception of the pipe to be coupled, the wall of said aperture being of substantially greater diameter than the external diameter of said pipe and having an axially sloped surface extending the entire width of said follower wall and sloping inwardly from the inner face to the outer face of said wall, self-acting locking means disposed in said aperture adjacent said sloped surface, gasket follower means and spacing means for preventing contact between said gasket follower means and the portion of the follower nut wall adjacent said aperture, said locking means having an outer peripheral surface of substantially the same slope as that of the sloped surface of the aperture wall for frictional engagement therewith and having a serrated inner peripheral surface, and said locking means extending at least between said inner and outer faces of said follower nut wall, substantially all of the inner radial surface of said gasket member engaging the surface of said pipe and substantially filling the annular cavity of said follower nut whereby said gasket member receives compression forces from said follower nut other than those directed to said locking means, said gasket member and said locking means being urged against the surface of said pipe upon tightening of said follower nut, and deformable metallic anti-friction means for wholly confining the axially outer face of said gasket and preventing direct contact between said gasket and said locking means.

6. In a pipe line, a section of pipe and a pipe coupling mounted thereon, said coupling comprising a tubular sleeve having an externally-threaded end providing an internal gasket recess receiving a gasket member, a cup-shaped follower nut threadedly engageable with said sleeve to apply pressure directly to said gasket to compress said gasket member in said gasket recess into fluid sealing relationship with said pipe, said nut having an end wall defining a pipe-receiving aperture for reception of the pipe to be coupled, the wall of said aperture being of substantially greater diameter than the external diameter of said pipe and having an axially sloped surface extending the entire width of said follower wall and sloping inwardly from the inner face to the outer face of said wall, self-acting locking means disposed in said aperture adjacent said sloped surface, gasket follower means and spacing means integral with said follower nut for preventing contact between said gasket follower means and the portion of the follower nut wall adjacent said aperture, said locking means having an outer peripheral surface of substantially the same slope as that of the sloped surface of the aperture wall for frictional engagement therewith and having a serrated inner peripheral surface, and said locking means extending at least between said inner and outer faces of said follower nut wall, substantially all of the inner radial surface of said gasket member engaging the surface of said pipe and substantially filling the annular cavity of said follower nut whereby said gasket member receives compression forces from said follower nut other than those directed to said locking means, said gasket member and said locking means being urged against the surface of said pipe upon tightening of said follower nut, and deformable metallic anti-friction means for wholly confining the axially outer face of said gasket and preventing direct contact between said gasket and said locking means.

7. In a pipe line, a section of pipe and a pipe coupling mounted thereon, said coupling comprising a tubular sleeve having an externally-threaded end providing an internal gasket recess receiving a gasket member, a cup-shaped follower nut threadedly engageable with said sleeve to apply pressure directly to said gasket to compress said gasket member in said gasket recess into fluid sealing relationship with said pipe, said nut having an end wall defining a pipe-receiving aperture for reception of the pipe to be coupled, a plurality of circumferentially-spaced recesses in said wall increasing the diameter of said aperture to a value substantially greater than the external diameter of said pipe and having an axially sloped surface extending the entire width of said follower wall and sloping inwardly from the inner face to the outer face of said wall, and self-acting locking means disposed in each of said recesses, said locking means having an outer peripheral surface of substantially the same slope as that of the sloped surface of the recess wall for frictional engagement therewith and having a serrated inner peripheral surface, and said locking means extending at least between said inner and outer faces of said follower nut wall, substantially all of the inner radial surface of said gasket member engaging the surface of said pipe and substantially filling the annular cavity of said follower nut whereby said gasket member receives compression forces from said follower nut other than those directed to said locking means, said gasket member and said locking means being urged against the surface of said pipe upon tightening of said follower nut, and deformable anti-friction means for wholly confining the axially outer face of said gasket and preventing direct contact between said gasket and said locking means.

8. In a pipe line, a section of pipe and a pipe coupling mounted thereon, said coupling comprising a tubular sleeve having an externally-threaded end providing an internal gasket recess receiving a gasket member, a cup-shaped follower nut threadedly engageable with said sleeve to apply pressure directly to said gasket to compress said gasket member in said gasket recess into fluid sealing relationship with said pipe, said nut having an end wall defining a pipe-receiving aperture for reception of the pipe to be coupled, the wall of said aperture being of substantially greater diameter than the external diameter of said pipe and having an axially sloped surface extending the entire width of said follower wall and sloping inwardly from the inner face to the outer face of said wall, a self-acting annular locking element of trapezoidal cross-section disposed in said aperture adjacent said sloped surface, said locking means having an axial width greater than the axial width of said aperture and having an outer peripheral surface of substantially the same slope as that of the sloped surface of the apertured wall for frictional engagement therewith and being provided with a serrated inner peripheral surface, and said locking member extending at least between said inner and outer faces of said follower nut wall, substantially all of the inner radial surface of said gasket member engaging the surface of said pipe and substantially filling the annular cavity of said follower nut whereby said gasket member receives compression forces from said follower nut other than those directed to said locking element, said gasket member and said locking element being urged against the surface of said pipe upon tightening of said follower nut, and means for wholly confining the axially outer face of said gasket and preventing direct contact between said gasket and said locking means, said last-named means comprising a readily deformable metal follower disposed between said gasket and said follower nut wall and said locking element, said follower being normally deformed axially-inwardly by said locking means upon tightening of said nut.

References Cited in the file of this patent

UNITED STATES PATENTS

| | | |
|---|---|---|
| 433,489 | Potts | Aug. 5, 1890 |
| 1,079,690 | Bowler et al. | Nov. 25, 1913 |
| 1,586,793 | Fowler | June 1, 1926 |
| 2,017,994 | Spang | Oct. 22, 1935 |
| 2,148,036 | Pfefferle | Feb. 21, 1939 |
| 2,354,538 | Parker | July 25, 1944 |
| 2,358,408 | McMurray | Sept. 19, 1944 |
| 2,474,319 | Muller | June 28, 1949 |
| 2,529,552 | Herold | Nov. 14, 1950 |